(12) United States Patent
Kim et al.

(10) Patent No.: US 10,073,304 B2
(45) Date of Patent: Sep. 11, 2018

(54) DISPLAY PANEL INCLUDING BARRIER WALL AND LIQUID CRYSTAL DISPLAY DEVICE HAVING THE SAME

(71) Applicant: SAMSUNG DISPLAY CO., LTD., Yongin-si, Gyeonggi-do (KR)

(72) Inventors: Kyungho Kim, Seongnam-si (KR); Nahyeon Cha, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/627,528

(22) Filed: Jun. 20, 2017

(65) Prior Publication Data

US 2018/0004022 A1    Jan. 4, 2018

(30) Foreign Application Priority Data

Jun. 30, 2016    (KR) .................. 10-2016-0082314

(51) Int. Cl.
| | |
|---|---|
| *G02F 1/1339* | (2006.01) |
| *G02F 1/1335* | (2006.01) |
| *G02F 1/1362* | (2006.01) |
| *G02F 1/1337* | (2006.01) |

(52) U.S. Cl.
CPC ........ *G02F 1/1339* (2013.01); *G02F 1/13378* (2013.01); *G02F 1/13394* (2013.01); *G02F 1/133512* (2013.01); *G02F 1/133514* (2013.01); *G02F 1/136286* (2013.01); *G02F 2001/133742* (2013.01)

(58) Field of Classification Search
CPC ................ G02F 1/1333; G02F 1/1335; G02F 1/133512; G02F 1/13394; G02F 1/1339; G02F 1/133514; G02F 1/136209; G02F 1/133345; G02F 1/1368; G02F 1/1362; G02F 2001/133388; G02F 2001/136222; G02F 2001/133357; G02F 2001/13398
USPC ............ 349/106, 156, 110, 153, 158, 42, 43
See application file for complete search history.

(56) References Cited

U.S. PATENT DOCUMENTS

| | | |
|---|---|---|
| 9,213,201 B2 | 12/2015 | Jung et al. |
| 2010/0014042 A1 | 1/2010 | Komeno et al. |
| (Continued) | | |

FOREIGN PATENT DOCUMENTS

| | | |
|---|---|---|
| KR | 1020120088220 A | 8/2012 |
| KR | 1020160049150 A | 5/2016 |

*Primary Examiner* — Thoi Duong
(74) *Attorney, Agent, or Firm* — Cantor Colburn LLP

(57) ABSTRACT

A display device includes: a lower substrate including a display area and a non-display area; an upper substrate facing the lower substrate; a sealing portion on the non-display area and between the lower substrate and the upper substrate; an optical transmittance layer between the lower substrate and the upper substrate, and surrounded by the sealing portion; a first light blocking portion on the display area of the lower substrate; and a second light blocking portion on the non-display area of the lower substrate. The second light blocking portion includes a base portion, a barrier wall protruding from the base portion and a protruding portion protruding from the barrier wall. A total height of the second light blocking portion at the base portion thereof is less than a total height of the second light blocking portion at the barrier wall and the protruding portion thereof.

15 Claims, 11 Drawing Sheets

(56) References Cited

U.S. PATENT DOCUMENTS

2015/0029428 A1\* 1/2015 Wang .................... G02B 5/201
  349/42
2016/0116772 A1 4/2016 Cha et al.

\* cited by examiner

DISPLAY PANEL INCLUDING BARRIER WALL AND LIQUID CRYSTAL DISPLAY DEVICE HAVING THE SAME

This application claims priority to Korean Patent Application No. 10-2016-0082314, filed on Jun. 30, 2016, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device capable of substantially reducing or effectively preventing an alignment solution from spreading to an outer edge of a substrate and substantially reducing or effectively preventing light leakage that may be caused because liquid crystals are not filled up to the outer edge of the substrate.

2. Description of the Related Art

In a modern information society, display devices have become more important as a visual information delivery medium. In order to take a major position in the future, such display devices will be designed to meet requirements such as relatively low power consumption, thinness, light weight, and high image quality.

Such display devices may include a self-luminous type, as self-emitting light, such as a cathode ray tube ("CRT") display device, an electroluminescence ("EL") display device, a light emitting diode ("LED") display device, a vacuum fluorescent display ("VFD") device, a field emission display ("FED") device and a plasma display panel ("PDP") device, and a non-self-luminous type such as a liquid crystal display ("LCD") device.

Among display devices, the LCD device is a device that displays an image using optical anisotropy of liquid crystals as an optical transmission or optical medium layer to control transmittance of light in displaying an image. The LCD device, along with the PDP device and the FED device, has recently attracted attention as a next-generation display device because of superior visibility thereof as compared to a conventional CRT display device and less average power consumption and less heat generation thereof than a CRT having a similar screen size.

Generally, an LCD device has a structure in which a lower substrate in which thin film transistors ("TFTs") are arranged and an upper substrate are bonded together with a liquid crystal layer interposed therebetween. In such an example, an alignment layer is provided on each of uppermost layers of the lower substrate and the upper substrate, and the initial alignment direction of the liquid crystals is determined by the alignment layers.

SUMMARY

Exemplary embodiments of the invention may be directed to a liquid crystal display ("LCD") device capable of reducing or substantially preventing contamination of a sealing-portion forming area and light leakage at an edge portion of a substrate.

According to an exemplary embodiment, a display device includes: a lower substrate including a display area and a non-display area; an upper substrate; a sealing portion on the non-display area and between the lower substrate and the upper substrate; an optical transmittance layer between the lower substrate and the upper substrate, such layer being surrounded by the sealing portion; a first light blocking portion on the display area of the lower substrate; and a second light blocking portion on the non-display area of the lower substrate. The second light blocking portion includes a base portion, a barrier wall protruding from the base portion and a protruding portion protruding from the barrier wall. A total height of the second light blocking portion at the base portion thereof is less than a total height of the second light blocking portion at the barrier wall and the protruding portion thereof.

The display device may further include a color filter between the lower substrate and the first light blocking portion.

The display device may further include a color filter residual pattern between the lower substrate and the protruding portion.

The display device may further include at least one column spacer on the lower substrate.

The column spacer may include a same material as a material of the first light blocking portion and the second light blocking portion.

In a top plan view, the barrier wall may include a first wall portion extending parallel to the sealing portion and a second wall portion extending from the first wall portion at a predetermined angle.

The first wall portion and the second wall portion may form a closed loop.

In the top plan view, a shape of the closed loop may be at least one selected from a quadrangle, a pentagon, a hexagon and an octagon.

The protruding portion may be located at an intersection of the first wall portion and the second wall portion.

A total height of the first light blocking portion on the display area may be the same as a total height of the barrier wall.

The display device may further include a signal wiring extended from the non-display area to the display area, on the lower substrate, such signal wiring disposed between the second light blocking portion on the non-display area and the lower substrate.

The display device may further include a driver which provides a signal to the display area to display the image, such driver being adjacent to the sealing portion and connected to the signal wiring disposed between the second light blocking portion on the non-display area and the lower substrate.

The foregoing is illustrative only and is not intended to be in any way limiting. In addition to the illustrative exemplary embodiments and features described above, further exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, where.

DETAILED DESCRIPTION

Figure 1:
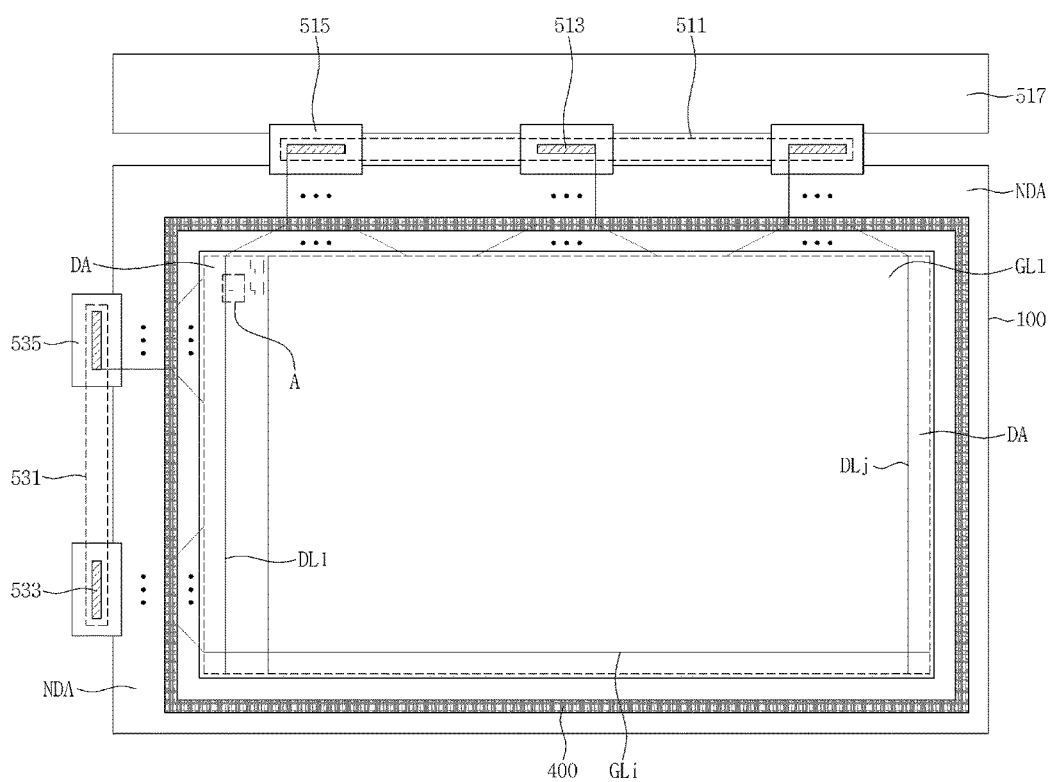
FIG. 1 is a top plan view illustrating an exemplary embodiment of a lower panel of a display panel of a display device and a peripheral circuit which is connected thereto according to the invention.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, thicknesses of a plurality of layers and areas are illustrated in an enlarged manner for clarity and ease of description thereof. When a layer, area, or plate is referred to as being related to another layer such as being "on" another layer, area, or plate, it may be directly on the other layer, area, or plate, or intervening layers, areas, or plates may be present therebetween. Conversely, when a layer, area, or plate is referred to as being related to another layer such as being "directly on" another layer, area, or plate, intervening layers, areas, or plates may be absent therebetween. Further when a layer, area, or plate is referred to as being related to another layer such as being "below" another layer, area, or plate, it may be directly below the other layer, area, or plate, or intervening layers, areas, or plates may be present therebetween. Conversely, when a layer, area, or plate is referred to as being related to another layer such as being "directly below" another layer, area, or plate, intervening layers, areas, or plates may be absent therebetween.

The spatially relative terms "below," "beneath," "under," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "physically connected" to the other element or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe exemplary embodiments of the invention, and like reference numerals refer to like elements throughout the specification.

An alignment layer of a display device such as a liquid crystal display ("LCD") device is formed through a baking process after applying an alignment material solution of a liquid type to a substrate.

However, due to the spreadability of the alignment material solution, the alignment material solution may penetrate to a sealing-portion forming area of the display device which is located at an edge portion of the substrate. When the alignment material solution penetrates into the sealing-portion forming area, the finally-formed alignment layer is also located in the sealing-portion forming area after the baking process. In such a case, at the portion where the finally-formed alignment layer overlaps the sealing portion within the display device, a gap defect occurs according to a height of the alignment layer. In addition, the sealing-portion forming area is contaminated by the alignment material solution such that the adhesiveness of the alignment layer is weakened. Accordingly, the adhesiveness between the lower substrate and the upper substrate of the display device may be degraded.

In addition, a material of an optical medium layer such as liquid crystals of the LCD device is not sufficiently filled up to the outer edge of the substrate. Where the liquid crystals of the LCD device are not sufficiently filled up to the outer edge of the substrate, light leakage may be generated and may be visually recognized by the user, such that display quality of the display device may be degraded.

Figure 2A:
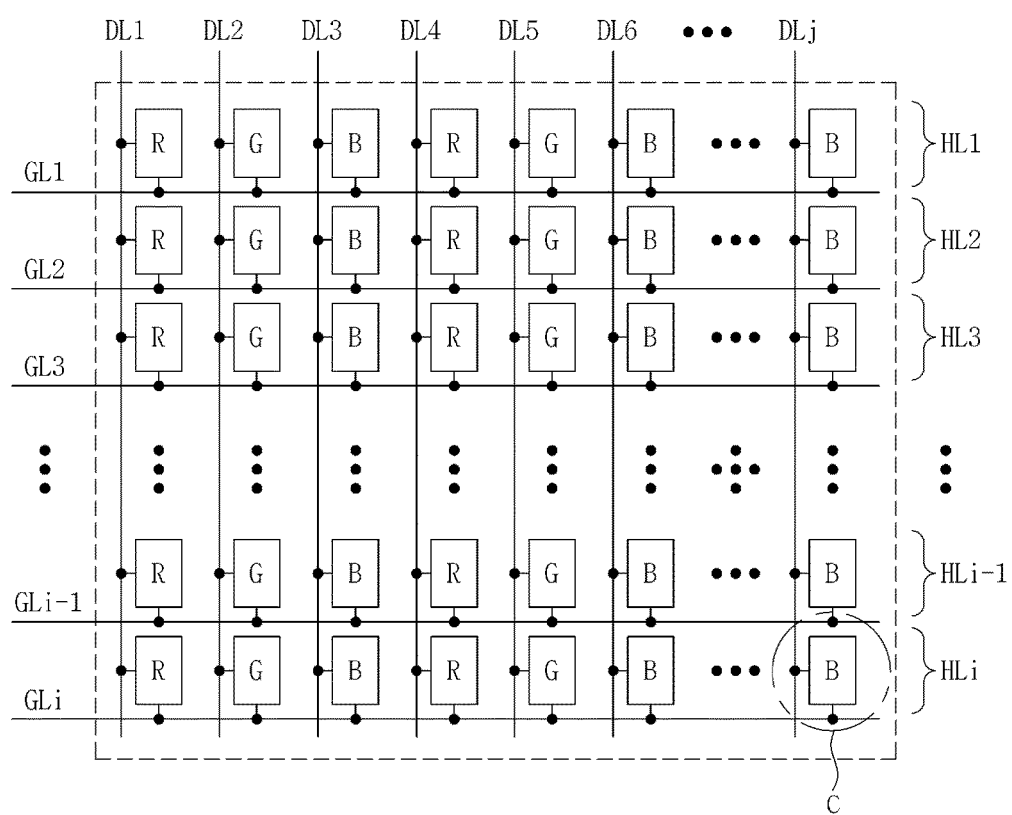
FIG. 2A is a top plan view schematically illustrating an exemplary embodiments of pixels included in a display panel according to the invention.
Figure 2B:
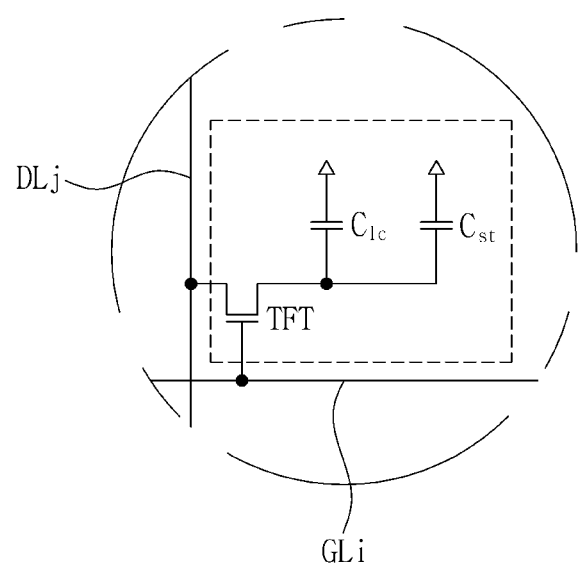
FIG. 2B is an enlarged top plan view of area C in FIG. 2A.
Figure 3:
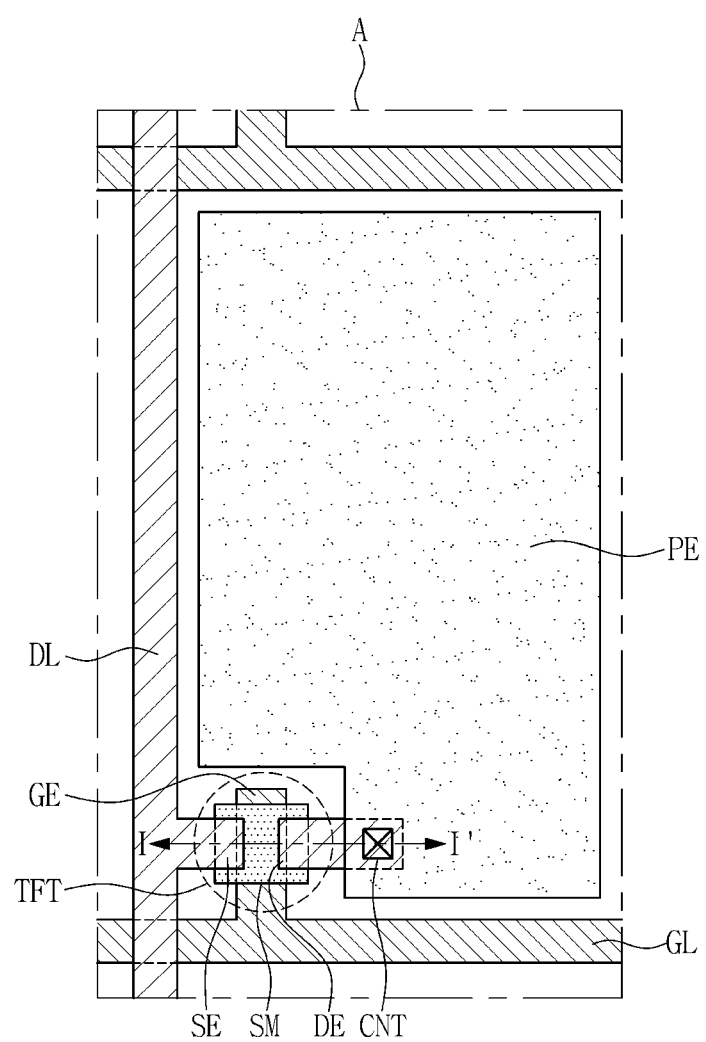
FIG. 3 is an enlarged top plan view illustrating area A of the lower panel of FIG. 1.
Figure 4:
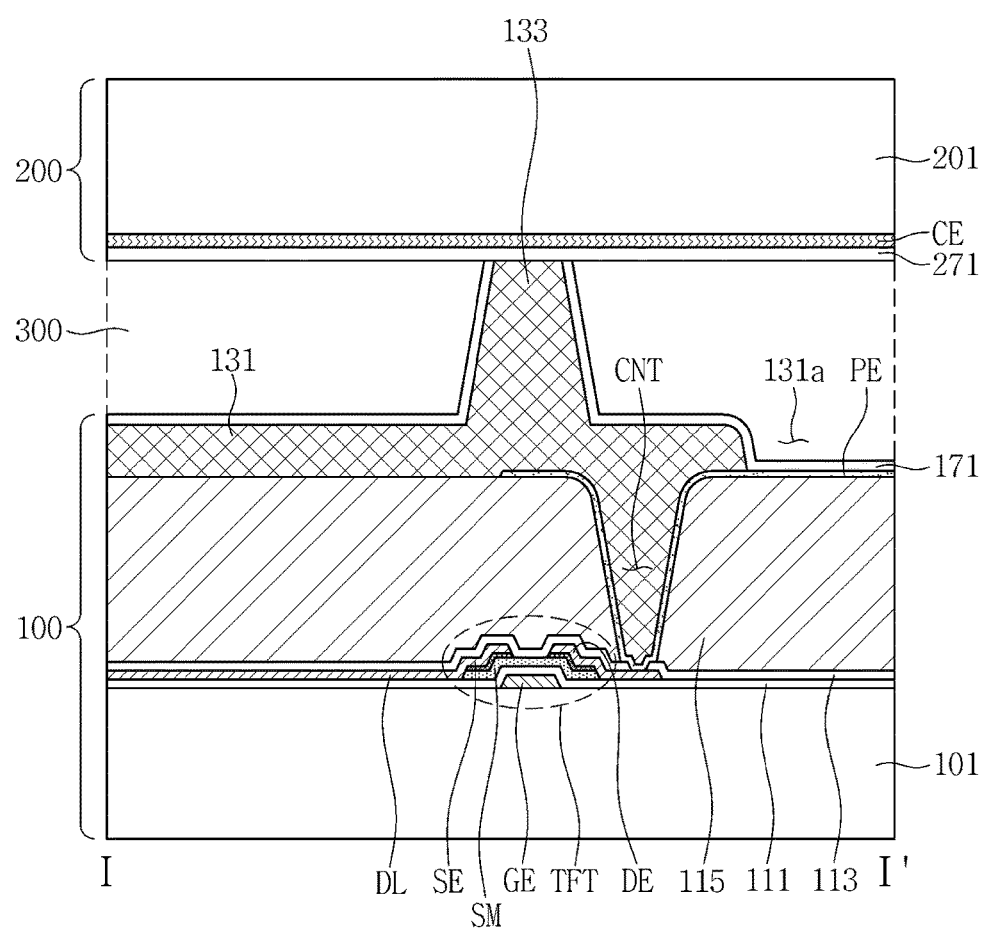
FIG. 4 is a cross-sectional view of an exemplary embodiment of a display panel taken along line I-I' of FIG. 3.

FIG. 1 is a top plan view illustrating a lower panel of a display panel of a display device such as a liquid crystal display ("LCD") device, and a peripheral circuit which is connected thereto according to an exemplary embodiment, FIG. 2A is a top plan view schematically illustrating an exemplary embodiment of pixels included in a display panel according to the invention, FIG. 2B is an enlarged top plan view of area C in FIG. 2A, FIG. 3 is an enlarged top plan view illustrating area A of the lower panel of FIG. 1, and FIG. 4 is a cross-sectional view of an exemplary embodiment of a display panel taken along line I-I' of FIG. 3.

As illustrated in FIG. 1, an exemplary embodiment of a display device such as the LCD device according to the invention includes a display panel, a gate driver 531 and a data driver 511.

The display panel includes a lower panel 100, an upper panel 200, an optical medium layer such as a liquid crystal layer 300 and a sealing portion 400. The display panel is divided into a display area DA at which an image is generated and/or displayed with light and a non-display area NDA at which the image is not displayed.

The display area DA of the display panel corresponds to a display area DA of the lower panel 100 and a display area DA of the upper panel 200. The non-display area NDA of the display panel corresponds to a non-display area NDA of the lower panel 100 and a non-display area NDA of the upper panel 200.

The sealing portion 400 is located between the lower panel 100 and the upper panel 200. In an exemplary embodiment, for example, the sealing portion 400 is located at the non-display area NDA of the lower panel 100. In an exemplary embodiment, for example, as illustrated in FIG. 1, the sealing portion 400 may have a closed loop shape surrounding the display area DA in the top plan view. The display device and/or the display panel are disposed in a plane defined by first and second directions which cross each other, such as horizontal and vertical directions of the view in FIG. 1. A thickness of the display device and/or the display panel is defined in a third direction which crosses both the first and second directions, such as the vertical direction in FIG. 4.

As illustrated in FIG. 1, the lower panel 100 includes a lower substrate 101, a gate line GL provided in plurality to define a plurality of gate lines GL1 to GLi, a data line DL provided in plurality to define a plurality of data lines DL1 to DLj, and a common line (not illustrated). The gate lines GL1 to GLi, the data lines DL1 to DLj and the common line are disposed on the lower substrate 101.

The data lines DL1 to DLj intersect the gate lines GL1 to GLi. Where the dotted line box in FIG. 2A indicates a portion of the display area DA in FIG. 1, the data lines DL1 to DLj intersect the gate lines GL1 to GLi within the display area DA. The gate lines GL1 to GLi define lengths thereof which extend from the display area DA to the non-display area NDA to be connected to the gate driver 531, and the data lines DL1 to DLj define lengths thereof which extend from the display area DA to the non-display area NDA to be connected to the data driver 511. The data lines DL1 to DLj and the gate lines GL1 to GLi may terminate in the non-display area NDA and/or the respective driver.

The gate driver 531 includes a gate driving integrated circuit ("IC") 533 provided in plurality. The gate driving ICs 533 generate gate signals and sequentially apply the gate signals to the first to i-th gate lines GL1 to GLn.

Each of the gate driving ICs 533 is mounted on a gate carrier 535. The gate carrier 535 may be provided in plurality within the gate driver 531. The gate carriers 535 are electrically connected to the lower panel 100. In an exemplary embodiment, for example, each of the gate carriers 535 may be electrically connected between a circuit board 517 and the non-display area NDA of the lower substrate 101.

The data driver 511 includes a data driving IC 513 provided in plurality. The data driving ICs 513 receive digital image data signals and a data control signal from a timing controller (not illustrated). The data driving ICs 513 sample the digital image data signals according to the data control signal, latch the sampled image data signals corresponding to one horizontal line in each horizontal period, and apply the latched image data signals to the data lines DL1 to DLj. That is, the data driving ICs 513 convert the digital image data signals applied from the timing controller into analog image signals using a gamma voltage input from a power supply (not illustrated) and apply the converted analog image signals to the data lines DL1 to DLj.

Each of the data driving ICs 513 is mounted on a data carrier 515. The data carrier 515 may be provided in plurality within the data driver 511. The data carriers 515 are connected between the circuit board 517 and the lower panel 100. In an exemplary embodiment, for example, each of the data carriers 515 may be electrically connected between the circuit board 517 and the non-display area NDA of the lower substrate 101.

The aforementioned timing controller and the power supply may be disposed at the circuit board 517. With such structure, the data carrier 515 includes input wirings (conductive signal lines) which transmit various signals applied from the timing controller and the power supply to the data driving ICs 513 and output wirings (conductive signal lines) that transmit image data signals output from the data driving IC 513 to corresponding ones of the data lines.

In an exemplary embodiment, at least one data carrier 515 may further include auxiliary wirings (conductive signal lines) that may transmit various signals applied from the timing controller and the power supply to the gate driver 531. Referring to FIG. 1, for example, an auxiliary wiring is shown extended from the data driving IC 513 and across the data carrier 515 toward the non-display area NDA of the lower panel 100. The auxiliary wirings of the data carrier 515 are connected to panel wirings (conductive signal lines) located at the lower substrate 101. Referring again to FIG. 1, for example, a panel wiring is shown extended from the data carrier 515 and onto the non-display area NDA of the lower panel 100. The panel wirings connect the auxiliary wirings and the gate driver 531 to one another.

Referring to FIGS. 1-4, the panel wirings may be formed on the non-display area NDA of the lower substrate 101, which corresponds to the non-display area NDA of the lower panel 100, in a line-on-glass manner. In FIG. 1, the panel wiring is shown extended toward the display area DA from an edge of the lower panel 100 (e.g., edge of the lower substrate 101), to cross the sealing portion 400 in the non-display area NDA.

Although not illustrated, the common line may be disposed between the sealing portion 400 and the lower substrate 101. The common line may be disposed along the sealing portion 400. However, the common line is absent from an intersecting portion among the sealing portion 400 and the gate link lines GL1 to GLi. In addition, the common line is absent from an intersecting portion among the sealing portion 400 and the data lines DL1 to DLj.

The common line receives a common voltage from the aforementioned power supply. To this end, the common line may be connected to the power supply through a conductive line on the gate carrier 535 and a conductive line on the data carrier 515.

The upper panel 200 includes an upper substrate 201 and a common electrode CE on the upper substrate 201.

The common electrode CE of the upper panel 200 is connected to the common line (not illustrated) of the lower panel 100 through a short circuit portion (not illustrated). The common electrode CE receives a common voltage from the common line through the short circuit portion.

As illustrated in FIGS. 2A and 2B, the display panel includes a plurality of pixels R, G and B. As illustrated in FIGS. 2A and 2B, the pixels R, G and B are located at the display area DA of the display panel. The image may be displayed at the pixels of the display panel.

The pixels R, G and B are arranged in a matrix in the first and second directions. The pixels R, G and B include a red pixel R displaying a red image, a green pixel G displaying a green image and a blue pixel B displaying a blue image. In such an exemplary embodiment, a red pixel R, a green pixel G and a blue pixel B that are adjacently disposed in a horizontal direction may define a unit pixel for displaying a unit image.

There are "j" number of pixels arranged along an n-th (n is one selected from 1 to i) horizontal line (hereinafter, n-th horizontal line pixels), which are connected to the first to j-th data lines DL1 to DLj, respectively. Further, the n-th horizontal line pixels are connected in common to the n-th gate line. Accordingly, the n-th horizontal line pixels receive an n-th gate signal as a common signal. That is, "j" number of pixels disposed in a same horizontal line receive a same gate signal from a same gate line, while pixels disposed in different horizontal lines receive different gate signals from different gate lines, respectively. From among first to i-th horizontal lines HL1 to JLi, for example, a red pixel R and a green pixel G in the first horizontal line HL1 receive a first gate signal as a common signal, while a red pixel R and a green pixel G in the second horizontal line HL2 receive a second gate signal that has a different timing from that of the first gate signal.

As illustrated in FIG. 2A and FIG. 2B, each of the pixels R, G and B includes a thin film transistor ("TFT"), a liquid crystal capacitor Clc and a storage capacitor Cst.

Referring to FIG. 2B, for example, the TFT is turned on according to a gate signal applied from the gate line GLi. The turned-on TFT applies the analog image data signal applied from the data line DLj to the liquid crystal capacitor Clc and the storage capacitor Cst.

The liquid crystal capacitor Clc includes a pixel electrode PE (refer to FIGS. 3 and 4) and the common electrode CE which oppose each other. Referring to FIG. 1 together with FIGS. 3 and 4, the pixel electrode PE may be provided in plurality in the display area DA.

The storage capacitor Cst includes the pixel electrode PE and an opposing electrode which oppose each other. In such an exemplary embodiment, the opposing electrode may be a previous gate line GLi-1 or a transmission line (not illustrated) which transmits the common voltage.

The lower panel 100 includes the lower substrate 101, a gate line GL, a data line DL, a TFT, a gate insulating layer 111, a protective layer 113, a color filter 115, a pixel electrode PE, a first light blocking portion 131, a column spacer 133 and a lower alignment layer 171.

The TFT (indicated by a dotted line circle in FIG. 4) includes a gate electrode GE, a semiconductor layer SM, a source electrode SE and a drain electrode DE.

The gate line GL and gate electrodes GE are located on the lower substrate 101. A contact portion (e.g., an end portion) of the gate line GL may have a larger planar area than a planar area of another portion of the gate line GL for connection to another layer of the display panel or an external driving circuit (not shown). Such end portion may be a terminal end of the gate line GL and may be disposed in the non-display area NDA. At least one of the gate line GL and the gate electrode GE may include or be formed of one of: aluminum (Al) or alloys thereof, silver (Ag) or alloys thereof, copper (Cu) or alloys thereof, molybdenum (Mo) or alloys thereof. Alternatively, at least one of the gate line GL, the gate electrode GE and the common line may include or be formed of one of: chromium (Cr), tantalum (Ta), and/or titanium (Ti). At least one of the gate line GL, the gate electrode GE and the common line may have a multilayer structure including at least two conductive layers that have different physical properties.

The gate insulating layer 111 is disposed on the gate line GL and the gate electrode GE. In such an exemplary embodiment, the gate insulating layer 111 is disposed over an entire surface of the lower substrate 101 including the gate line GL and the gate electrode GE thereon. The gate insulating layer 111 may include or be formed of silicon nitride (SiNx) or silicon oxide (SiOx). The gate insulating layer 111 may have a multilayer structure including at least two insulating layers having different physical properties.

The semiconductor layer SM is located on the gate insulating layer 111. In such an exemplary embodiment, the semiconductor layer SM overlaps the gate electrode GE. The semiconductor layer SM may include amorphous silicon, polycrystalline silicon, or the like.

An ohmic contact layer is located on the semiconductor layer SM. The ohmic contact layer may include silicide or n+ hydrogenated amorphous silicon doped with n-type impurity ions, e.g., phosphorus (P), at high concentration. The ohmic contact layer may be disposed on the semiconductor layer SM in pairs. A pair of ohmic contact layers is shown in FIG. 4 respectively between the semiconductor layer SM, and the data line DL and the drain electrode DE.

The data line DL is disposed on the gate insulating layer 111. Although not illustrated, a contact portion (e.g., an end portion) of the data line DL may have a larger planar area than a planar area of another portion of the data line DL for connection to another layer or an external driving circuit (not shown). Such end portion may be a terminal end of the data line DGL and may be disposed in the non-display area NDA. The data line DL intersects the gate line GL in the top plan view.

As shown in FIG. 3, the data line defines a length extending in the vertical direction and a width extending in the horizontal direction. Although not illustrated, a portion of the data line DL at the intersection with the gate line GL may have a smaller line width than that of a remaining portion of the data line DL. Accordingly, a parasitic capacitance between the data line DL and the gate line GL may be reduced. The data line DL may include a substantially same material and/or have a substantially same structure (a multilayer structure) as those of the source electrode SE. In an exemplary embodiment of manufacturing a display panel, the data line DL and the source electrode SE may be provided substantially simultaneously in a substantially same process, from a same material layer, to be disposed in a same layer of the lower panel 100 among layers on the lower substrate 101.

The source electrode SE is located on a portion of the semiconductor layer SM. The source electrode SE extends from the data line DL. In an exemplary embodiment, for example, as illustrated in FIG. 3, the source electrode SE has a shape protruding from the data line DL toward the gate electrode GE in the top plan view. The source electrode SE overlaps the semiconductor layer SM and the gate electrode GE. The source electrode SE may include or be formed of a refractory metal, such as molybdenum, chromium, tantalum, titanium and/or an alloy thereof. The source electrode SE may have a multilayer structure including a refractory metal layer and a low-resistance conductive layer. Examples of the multilayer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In an alternative exemplary embodiment, the source electrode SE may include or be formed of any suitable metals and/or conductor materials rather than the aforementioned materials.

The drain electrode DE is located on another portion of the semiconductor layer SM. The drain electrode DE overlaps the gate electrode GE and the semiconductor layer SM. The drain electrode DE is connected to the pixel electrode PE. The drain electrode DE may include a substantially same material and have a substantially same structure (a multilayer structure) as those of the source electrode SE. In an exemplary embodiment of manufacturing a display panel, the data line DL and the source electrode SE may be provided simultaneously in a substantially same process from a same material layer, to be disposed in a same layer of the lower panel 100 among layers on the lower substrate 101.

The gate electrode GE, the source electrode SE and the drain electrode DE, together with the semiconductor layer SM, form a TFT. In such an exemplary embodiment, a channel of the TFT is located at a portion of the semiconductor layer SM between the source electrode SE and the drain electrode DE. Such portion of the semiconductor layer SM may be exposed between the source electrode SE and the drain electrode DE.

The protective layer 113 is located on the data line DL, the source electrode SE, the drain electrode DE and the gate insulating layer 111. In such an exemplary embodiment, the protective layer 113 may be located on an entire surface of the lower substrate 101 including the data line DL, the source electrode SE, the drain electrode DE and the gate insulating layer 111 thereon. The protective layer 113 has a contact hole CNT defined therein exposing the drain electrode DE. The drain electrode DE may be connected to the pixel electrode PE at such contact hole CNT.

The protective layer 113 may include an inorganic insulating material such as silicon nitride ($SiN_x$) or silicon oxide ($SiO_x$), and in such an exemplary embodiment, an inorganic insulating material having photosensitivity and a dielectric constant of about 4.0 may be used. In an alternative exemplary embodiment, the protective layer 113 may have a double-layer structure including a lower inorganic layer and an upper organic layer, which is found to impart excellent insulating properties and not to damage an exposed portion of the semiconductor layer SM. The protective layer 113 may have a thickness greater than or equal to about 5000 angstroms (Å), e.g., in a range of about 6000 Å to about 8000 Å.

The color filter 115 is provided on the protective layer 113. The color filter CF may be provided in plurality in the display area DA of the display panel. An edge of the color filter 115 may be located on the gate line GL, the TFT and the data line DL. An edge of the color filter 115 may overlap an edge of another color filter adjacent thereto. The color filter 115 may include a photosensitive organic material.

The pixel electrode PE is connected to the drain electrode DE at and through the contact hole CNT. The pixel electrode PE is located on the color filter 115. The pixel electrode PE is located corresponding to an opening 131a of the first light blocking portion 131 to be described below and a portion of the pixel electrode PE may overlap the first light blocking portion 131 which defines the opening 131a. The pixel electrode PE may include a transparent conductive material, e.g., indium tin oxide ("ITO") or indium zinc oxide ("IZO"). In such an exemplary embodiment, for example, ITO may include a polycrystalline material or a monocrystalline material, and IZO may include a polycrystalline material or a monocrystalline material.

The first light blocking portion 131 is located on the color filter 115 and the pixel electrode PE. As described above, the first light blocking portion 131 has the opening 131a defined therein. The first light blocking portion 131 blocks light at a portion of the display panel other than at the openings 131a. In an exemplary embodiment, for example, the first light blocking part 131 is located on at least one of the TFT, the gate line GL and the data line DL to prevent a light passing therethrough from being emitted to the outside.

The first light blocking part 131 may include a photosensitive composition. In such an exemplary embodiment, examples of the photosensitive composition may include: a binder resin, a polymerizable monomer, a polymerizable oligomer, a pigment, a dispersant and a photoinitiator. The pigment may use a black pigment, a black resin, or the like, e.g., a carbon black.

The column spacer 133 may be located on the first light blocking portion 131. The column spacer 133 has a shape protruding toward the upper panel 200 to a predetermined height. The column spacer 133 maintains a constant cell gap between the lower panel 100 and the upper panel 200. The column spacer 133 may be integrally formed with the first light blocking portion 131. In an exemplary embodiment of manufacturing a display panel, the column spacer 133 and the first light blocking portion 131 may be manufactured substantially simultaneously using a substantially same material layer, to be disposed in a same layer of the lower panel 100 among layers on the lower substrate 101. The first light blocking portion 131 may extend to define the column spacer 133.

The lower alignment layer 171 is located on the first light blocking portion 131, the column spacer 133 and the pixel electrode PE. The lower alignment layer 171 may be a vertical alignment layer or a photo alignment layer including a photopolymerizable material.

The upper panel 200 includes the upper substrate 201, the common electrode CE and an upper alignment layer 271.

The upper substrate 201 may be an insulating substrate including a transparent material such as glass or plastic.

The common electrode CE is formed over an entire surface of the upper substrate 201. The common electrode CE may include a transparent conductive material, e.g., indium tin oxide ("ITO") or indium zinc oxide ("IZO"). The common electrode CE, together with the pixel electrodes PE on the lower substrate 101, applies an electric field over the liquid crystal layer 300.

The upper alignment layer 271 is located on the common electrode CE. The upper alignment layer may include a substantially same material as that included in the lower alignment layer 171.

An optical medium layer such as the liquid crystal layer 300 is located in the space defined between the lower panel 100, the upper panel 200 and the sealing portion 400. The liquid crystal layer 300 may include liquid crystal molecules having negative dielectric anisotropy and vertically aligned. Alternatively, the liquid crystal layer 300 may include a photopolymerizable material, and in such an exemplary embodiment, the photopolymerizable material may be a reactive monomer or a reactive mesogen.

Figure 5:
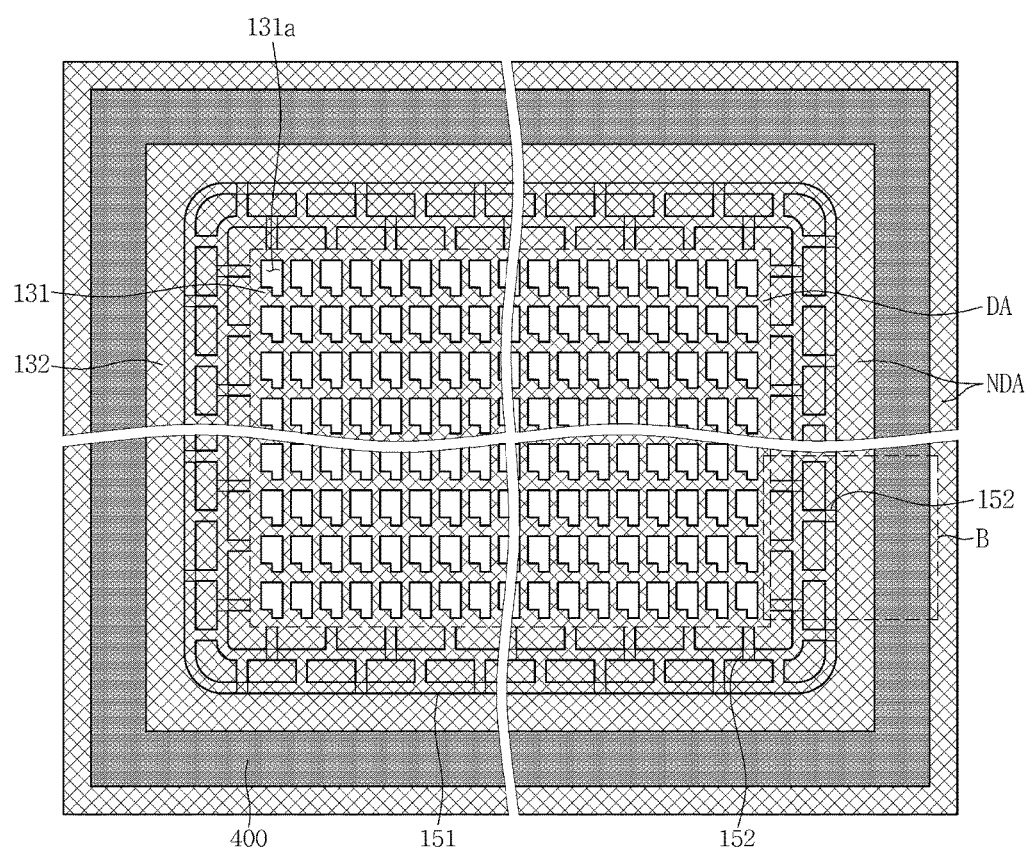
FIG. 5 is a top plan view illustrating an exemplary embodiment of a first light blocking portion, a second light blocking portion and a sealing portion of the lower panel of FIG. 1.
Figure 6:
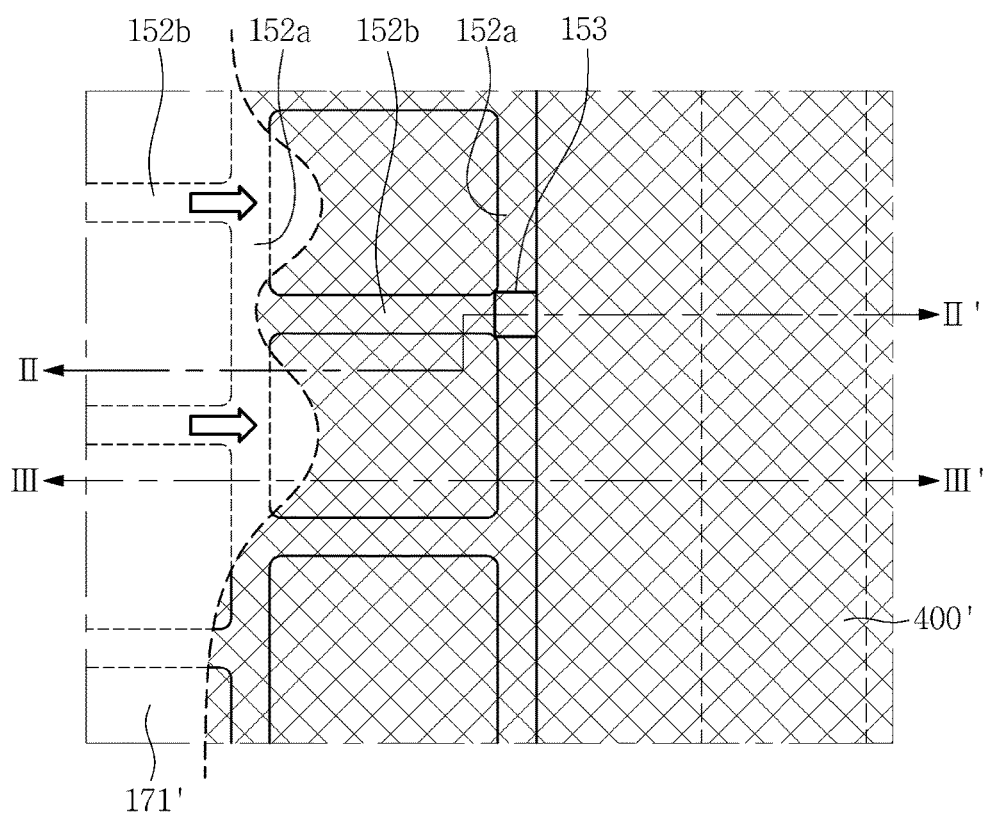
FIG. 6 is an enlarged top plan view illustrating area B of FIG. 5.
Figure 7:
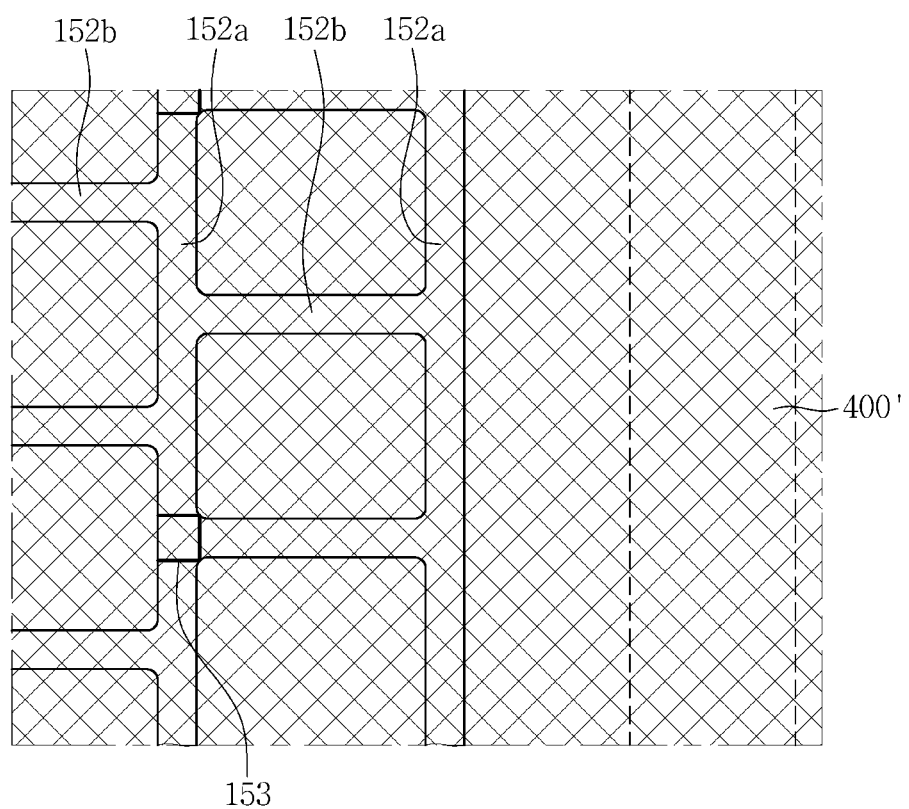
FIG. 7 is an enlarged top plan view illustrating another exemplary embodiment of area B of FIG. 5.
Figure 8:
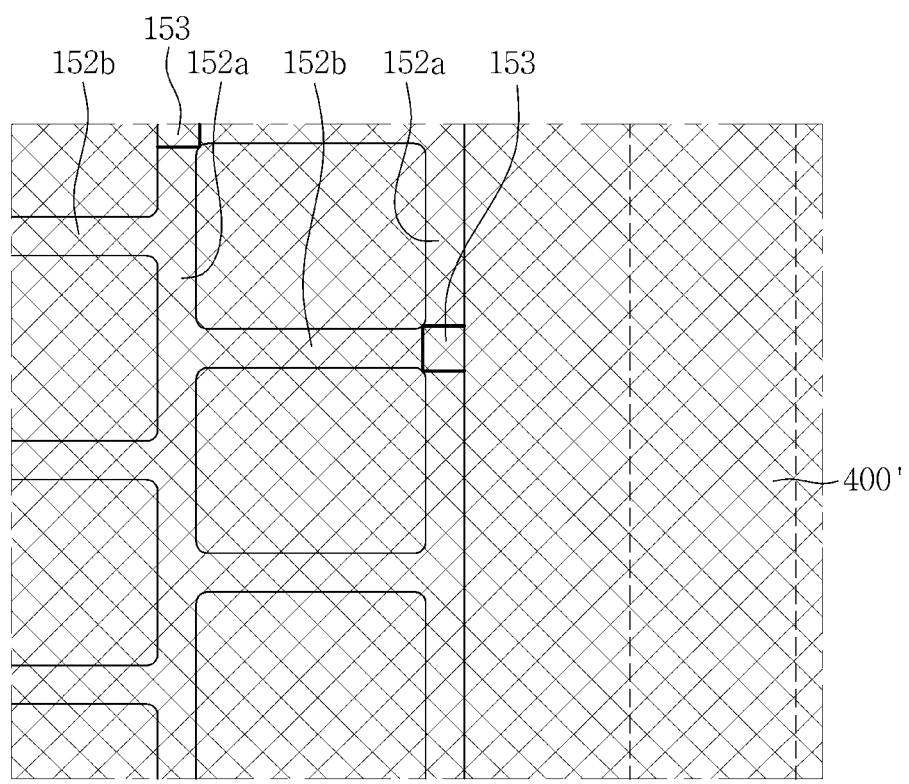
FIG. 8 is an enlarged top plan view illustrating still another exemplary embodiment of area B of FIG. 5.

FIG. 5 is a top plan view illustrating an exemplary embodiment of a first light blocking portion, a second light blocking portion and a sealing portion of FIG. 1, FIG. 6 is an enlarged to plan view illustrating area B of FIG. 5, FIG. 7 is an enlarged top plan view illustrating another exemplary embodiment of area B of FIG. 5, and FIG. 8 is an enlarged top plan view illustrating still another exemplary embodiment of area B of FIG. 5.

The first light blocking portion 131 is surrounded by a second light blocking portion 132 in the top plan view. As illustrated in FIG. 5, the first light blocking portion 131 has the opening 131a defined by portions of the first light blocking portion 131. The opening 131a is provided in plural within the first light blocking portion 131. A boundary of the first light blocking portion 131 may correspond to that of the display area DA, but the invention is not limited thereto. In an exemplary embodiment, a panel wiring PW extended toward the display area DA from an edge of the lower panel 100 may be disposed between the second light blocking member 132 and the lower substrate 101 (refer to FIG. 10).

The LCD device according to an exemplary embodiment includes the second light blocking portion 132. The second light blocking portion 132 is disposed at or adjacent to an edge portion of the lower substrate 101 and/or the lower panel 100, such as where the sealing portion 400 is disposed. The second light blocking portion 132 includes a base portion 151, a barrier wall 152 protruding from the base portion 151 and a protruding portion 153 protruding from the barrier wall 152. The base portion 151 is common to each of the barrier wall 152 and the protruding portion 153. The second light blocking portion 132 at the protruding portion 153 may be considered a column spacer and have a function similar to that of the column spacer 133 described above.

As illustrated in FIG. 6, the barrier wall 152 may include a first wall portion 152a and a second wall portion 152b. Each of the first wall portion 152a and the second wall portion 152b may be provided in plurality to collectively form portions of one barrier wall 152. In an exemplary embodiment, for example, the first wall portion 152a may define a length thereof which extends in a direction parallel to the length direction of the respective portion of sealing portion 400 adjacent thereto, and the second wall portion 152b may define length thereof which extends from the first wall portion 152a at a predetermined angle, such as to cross the first wall portion 152a. In an exemplary embodiment, for example, as illustrated in FIG. 6, the second wall portion 152b may be at right angles to the first wall portion 152.

The first wall portion 152a and the second wall portion 152b may collectively form a closed loop in the top plan view. In an exemplary embodiment, for example, the closed loop may have at least one shape in the top plan view selected from a quadrangle, a pentagon, a hexagon and an octagon. A plurality of the first and second wall portions 152a and 152b may collectively form a plurality of closed loops in the top plan view. The closed loops may be arranged in a direction parallel to the length direction of the respective portion of sealing portion 400 adjacent thereto. Such arranged closed loops may define a single barrier wall 152 extended in the direction parallel to the length direction of the respective portion of sealing portion 400 adjacent thereto. Adjacent closed loops within the single barrier wall 152 may share two first wall portions 152a common thereto and a second wall portion 152b therebetween.

Alternatively, two first wall portions 152a which are extended in the direction parallel to the length direction of a respective portion of sealing portion 400 along with one or more second wall portions 152b extended therebetween may also be considered as defining a single barrier wall 152. Additional second wall portions 152b may be extended from the one barrier wall 152 toward the display area DA.

Referring to FIG. 5, one barrier wall 152 is disposed between the sealing portion 400 and the display area DA. In an exemplary embodiment, although not illustrated, two or more barrier walls 152 may be provided between the sealing portion 400 and the display area DA. In an exemplary embodiment, for example, when two barrier walls 152 are provided, a first barrier wall may be located between the sealing portion 400 and the display area DA, and a second barrier wall may be located between said first barrier wall and the sealing portion 400. In such an exemplary embodiment, both of the barrier walls 152 may have a closed loop shape. The barrier wall 152 substantially reduced or effectively prevents a lower alignment solution (a material for forming the lower alignment layer) applied to the display area DA of the lower substrate 101 from spreading out of the display area DA.

The protruding portion 153 is located on the barrier wall 152. In an exemplary embodiment, for example, as illustrated in FIGS. 6, 7 and 8, the protruding portion 153 may be located at a portion where the first wall portion 152a of the barrier wall 152 and the second wall portion 152b thereof intersect each other. As illustrated in FIG. 6, among areas of the barrier wall 152, the protruding portion 153 may be located at a portion of an area closest and/or adjacent to an area 400' (hereinafter, a sealing-portion forming area) where the sealing portion 400 is to be formed, at which the first wall portion 152a intersects the second wall portion 152b.

Alternatively, among areas of the barrier wall 152, as illustrated in FIG. 7, the protruding portion 153 may be located at a portion of an area closest to or adjacent to the display area DA, at which the first wall portion 152a intersects the second wall portion 152b. Alternatively, as illustrated in FIG. 8, the protruding portion 153 may be located both at an area, adjacent to the sealing-portion forming area 400', at which the first wall portion 152a intersects the second wall portion 152b, and at an area, adjacent to the display area DA, at which the first wall portion 152a intersects the second wall portion 152b.

In an exemplary embodiment, the protruding portion 153 may be located at every portion where the first wall portion 152a of the barrier wall 152 and the second wall portion 152b thereof intersect each other. The position of the protruding portion 153 is not limited thereto and may be located only on the first wall portion 152a of the barrier wall 152 or only on the second wall portion 152b thereof.

Arrows illustrated in FIG. 6 indicate a flow direction of a lower alignment material solution 171'. As illustrated in the drawings by the dotted line boundary of the lower alignment material solution 171', the flow of the lower alignment material solution 171' from the display area DA toward the non-display area NDA is restricted or blocked by the barrier wall 152. That is, the lower alignment solution 171' flowing in a direction from the display area DA toward the non-display area NDA may not penetrate into the sealing-portion forming area 400' due to the barrier wall 152. In such a case, although flowing over the barrier wall 152 (e.g., at the left first wall portion 152a), the lower alignment material solution 171' is confined inside the barrier wall 152 having a closed loop shape. That is, the lower alignment material solution 171' flows into an inner space surrounded by the first wall portion 152a and the second wall portion 152b of a closed loop shape portion of the barrier wall 152. Accordingly, the sealing-portion forming area 400' of the lower substrate 101 is not contaminated by overflowed lower alignment material solution 171'. In addition, light leakage that may occur in the non-display area NDA may be substantially reduced or effectively prevented by the lower alignment material solution 171' filled in the inner space surrounded by the first wall portion 152a and the second wall portion 152b of the closed loop shape portion of the barrier wall 152.

Figure 9:
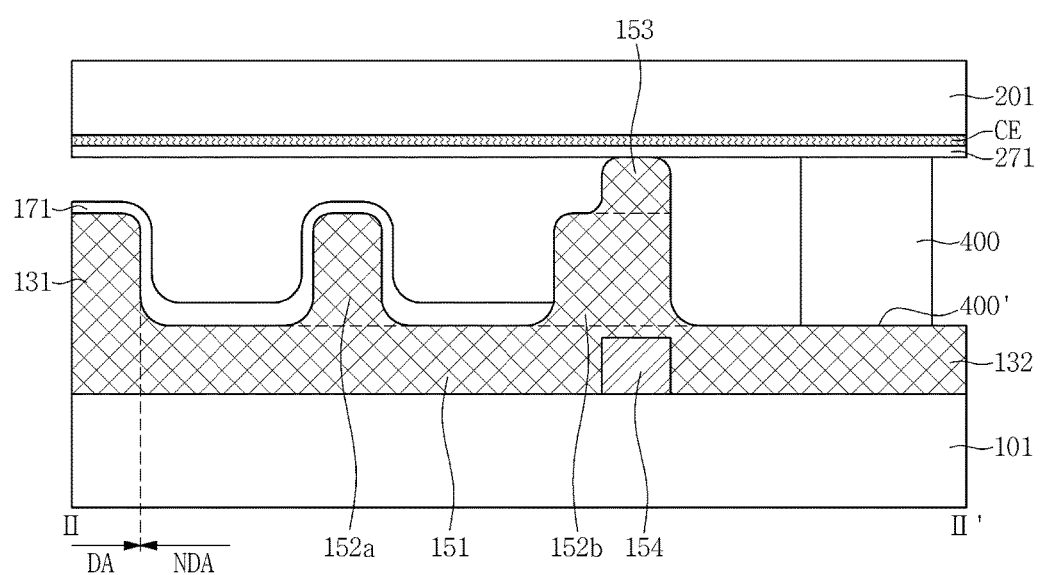
FIG. 9 is a cross-sectional view of an exemplary embodiment of a display panel taken along line II-II' of FIG. 6.

FIG. 9 is a cross-sectional view of an exemplary embodiment of a display panel taken along line II-II' of FIG. 6.

Referring to FIG. 9, the second light blocking portion 132 includes the base portion 151, the barrier wall 152 which protrudes from the base portion 151 and the protruding portion 153 which protrudes from the barrier wall 152.

A total height of the first light blocking portion 131 at the display area DA may be greater than a total height of the base portion 151 in the non-display area NDA and may be substantially equal to a total height of the barrier wall 152 in the non-display area NDA. The heights may be taken from a common reference such as an upper surface of the lower substrate 101.

The second light blocking portion 132 in the non-display area NDA may be formed integrally with the first light blocking part 131 in the display area DA. One of the first and second light blocking portions 131 and 132 may extend to define the other one of the first and second light blocking portions 131 and 132. Similarly, any one of the base portion 151, the barrier wall 152 and the protruding portion 153 may extend to define another one of the base portion 151, the barrier wall 152 and the protruding portion 153. In an exemplary embodiment of manufacturing a display panel, the second light blocking portion 132 and the first light blocking portion 131 may be formed substantially simultaneously using a substantially same material layer to be disposed in a same layer of the lower panel 100 among layers on the lower substrate 101.

In the thickness direction of the display panel, the barrier wall 152 has a shape protruding from the base portion 151. In such an exemplary embodiment, the barrier wall 152 of the non-display area NDA may have a substantially same height as the height of the first light blocking portion 131 in the display area DA. The barrier wall 152 may collectively include the first wall portion 152a and the second wall portion 152b. The first wall portion 152a and the second wall portion 152b may form a closed loop. The first wall portion 152a and the second wall portion 152b may be provided in plurality to define the closed-loop shape barrier wall 152. In an exemplary embodiment of manufacturing a display panel, the barrier wall 152 reduces or effectively prevents a lower alignment solution (a material of the lower alignment layer) applied to the display area DA of the lower substrate 101 from spreading out of the display area DA toward a sealing portion forming region.

In the thickness direction of the display panel, the protruding portion 153 protrudes from the barrier wall 152. A total height of the barrier wall 152 at the protruding portion 153 is greater than a total height of the first light blocking portion 131. The heights may be taken from a common reference such as an upper surface of the lower substrate 101. Accordingly, the protruding portion 153 may support the upper panel 200 as including the upper substrate 201 and layers thereon to reduce or effectively prevent sagging of the upper panel 200 and increase a distance between the lower substrate 101 and the upper substrate 201.

One or more exemplary embodiment of the display device as an LCD device according to the invention may further include a color filter residual pattern 154 between the protruding portion 153 and the lower substrate 101. In an exemplary embodiment, for example, the color filter residual pattern 154 in the non-display area NDA may include a substantially same material and be disposed in a same layer of the lower panel 100 as that of the color filter in the display area DA (refer to 115 in FIG. 4). The color filter residual pattern 154 may include a photosensitive organic material. Accordingly, the protruding portion 153 having a total height greater than that of the barrier wall 152 may be provided without an additional process in manufacturing the display panel.

Figure 10:
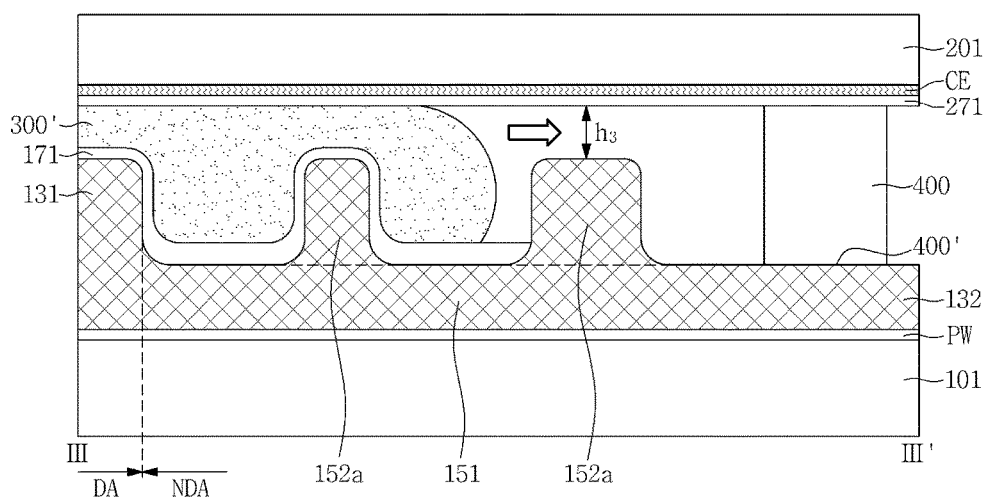
FIG. 10 is a cross-sectional view of the display panel taken along line of FIG. 6.

FIG. 10 is a cross-sectional view of the display panel taken along line of FIG. 6.

As described above, the protruding portion 153 has a shape protruding from the barrier wall 152 to a predetermined height taken from a common reference. The protruding portion 153 supports the upper panel 100 including the upper substrate 201 and layers thereon to increase a distance h3 between the lower panel 100 and the upper panel 200 at portions of the barrier wall 152 excluding the protruding portion 153. Accordingly, the protruding portion 153 may reduce or effectively prevent sagging of the upper panel 100 including the upper substrate 201 and layers thereon and improve the flow of liquid crystal material 300' in manufacturing the display panel.

An arrow illustrated in FIG. 10 indicates a flow direction of the liquid crystal material 300' in a direction from the display area DA to the non-display area NDA. As illustrated in the drawings, the distance between the lower substrate 101 and the upper substrate 201 and layers respectively thereon is increased due to the protruding portion 153, and the flow of the liquid crystal 300' material between the two panels 100 and 200 is improved. Accordingly, the liquid crystal material 300' may sufficiently fill the space between the barrier wall 152 and the sealing portion 400. Thus defective display of an image that may be caused because the liquid crystal material 300' is insufficiently filled in the space defined by the lower panel 100, the upper panel 200 and the sealing portion 400 may be substantially reduced or effectively prevented.

As set forth hereinabove, the display device such as an LCD device according to one or more exemplary embodiments have the following effects.

The barrier wall is disposed or formed in a closed loop shape in a top plan view so that flow of the alignment material solution may be reduced and confined within the barrier wall. Accordingly, the alignment material solution applied to the substrate may not penetrate into the sealing-portion forming area. Thus contamination of the sealing-portion forming area may be reduced or substantially prevented, and light leakage at the outer edge area of the substrate may be reduced by the alignment material solution confined in the barrier wall.

Further, the protruding portion protrudes from the barrier wall. The protruding portion may maintain a cell gap between upper and lower panels and improve the flow of the liquid crystals therebetween. Accordingly, an optical medium layer such as including the liquid crystals may sufficiently fill up to the outer edge area of the substrate, and light leakage generated at the outer edge of the substrate may be reduced or substantially prevented.

While the invention has been illustrated and described with reference to the exemplary embodiments thereof, it will be apparent to those of ordinary skill in the art that various changes in form and detail may be made thereto without departing from the spirit and scope of the invention.

What is claimed is:

1. A display device comprising:
   a lower substrate including a display area at which an image is displayed and a non-display area at which the image is not displayed;
   an upper substrate facing the lower substrate;
   a sealing portion at the non-display area and between the lower substrate and the upper substrate;
   an optical transmittance layer between the lower substrate and the upper substrate, the optical transmittance layer being surrounded by the sealing portion;
   a first light blocking portion on the display area of the lower substrate; and
   a second light blocking portion on the non-display area of the lower substrate,
   wherein
   the second light blocking portion comprises:
     a base portion,
     a barrier wall protruding toward the upper substrate from the base portion, and
     a protruding portion protruding toward the upper substrate from the barrier wall, and
   a total height of the second light blocking portion at the base portion thereof is less than a total height of the second light blocking portion at the barrier wall and the protruding portion thereof.

2. The display device as claimed in claim 1, further comprising a color filter between the lower substrate and the first light blocking portion.

3. The display device as claimed in claim 2, further comprising a color filter residual pattern between the lower substrate and the protruding portion of the second light blocking portion.

4. The display device as claimed in claim 1, further comprising at least one column spacer on the lower substrate.

5. The display device as claimed in claim 4, wherein the column spacer comprises a same material as that of the first light blocking portion on the display area and the second light blocking portion on the non-display area.

6. The display device as claimed in claim 4, wherein the second light blocking portion at the protruding portion thereof defines a column spacer between the display area and the sealing portion.

7. The display device as claimed in claim 1, wherein in a top plan view, the barrier wall comprises:
   a first wall portion extending parallel to the sealing portion, and
   a second wall portion extending from the first wall portion at a predetermined angle thereto.

8. The display device as claimed in claim 7, wherein the first wall portion and the second wall portion form a closed loop of the barrier wall.

9. The display device as claimed in claim 8, wherein in the top plan view, a shape of the closed loop is at least one selected from a quadrangle, a pentagon, a hexagon and an octagon.

10. The display device as claimed in claim 7, wherein the protruding portion of the second light blocking portion is located at an intersection of the first wall portion and the second wall portion of the second light blocking portion.

11. The display device as claimed in claim 1, wherein a total height of the first light blocking portion on the display area is the same as a total height of the barrier wall of the second light blocking portion on the non-display area.

12. The display device as claimed in claim 1, further comprising a signal wiring extended from the non-display area to the display area, on the lower substrate, such signal wiring disposed between the second light blocking portion on the non-display area and the lower substrate.

13. The display device as claimed in claim 12, further comprising a driver which provides a signal to the display area to display the image, such driver being adjacent to the sealing portion and connected to the signal wiring disposed between the second light blocking portion on the non-display area and the lower substrate.

14. The display device as claimed in claim 1, wherein
   the first light blocking portion extends from the display area to define an extended portion thereof in the non-display area, and
   the extended portion of the first light blocking portion defines the base portion of the second light blocking member on the non-display area.

15. The display device as claimed in claim 14, wherein
   the barrier wall protrudes from the base portion defined by the extended portion of the first light blocking portion, such barrier wall having a closed loop shape, and
   the optical transmittance layer extends from the display area to be disposed within the closed loop shape of the barrier wall defined by the extended portion of the first light blocking portion.

* * * * *